INVENTORS
HENRY W. WESSELLS, III
WALTER S. EGGERT, JR.

BY

ATTORNEY

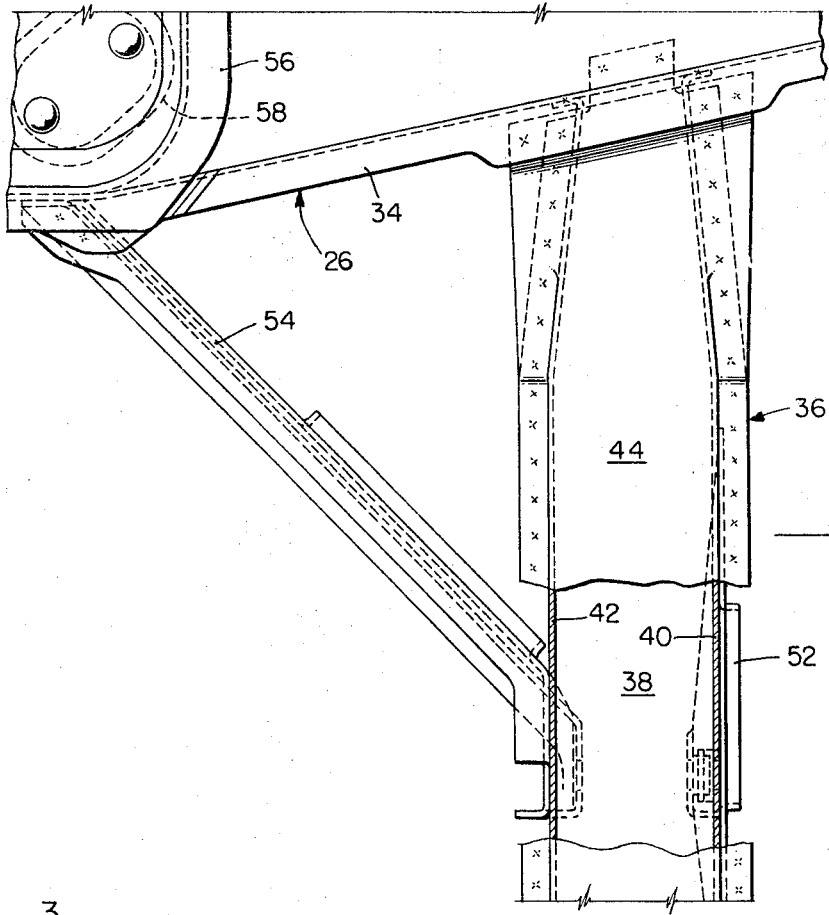
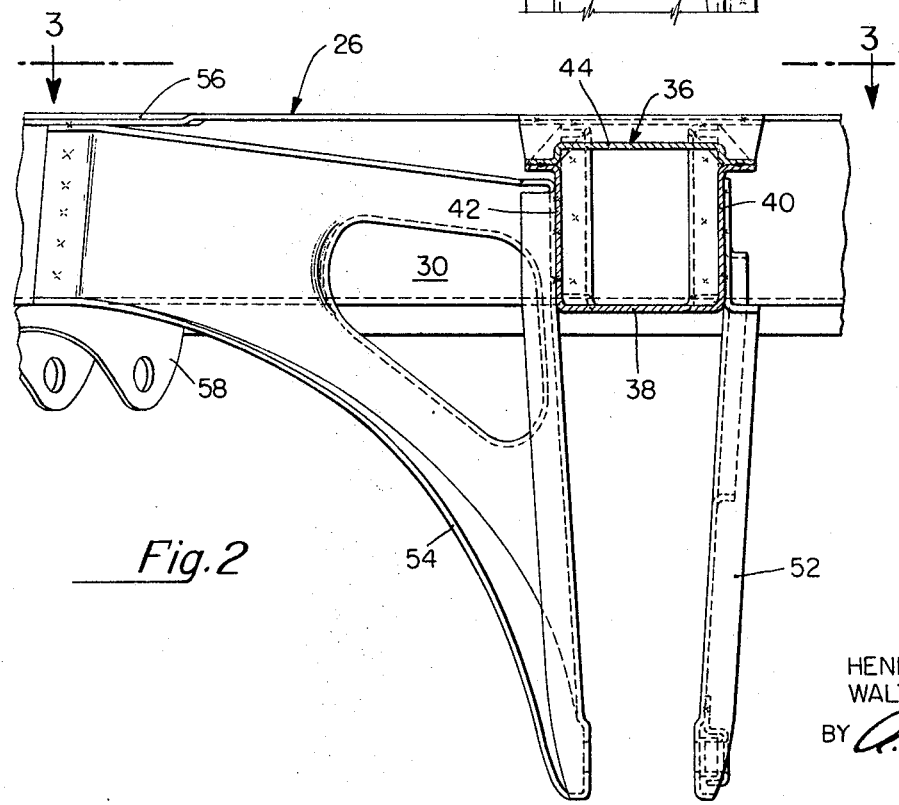

United States Patent Office 3,517,765
Patented June 30, 1970

3,517,765
VEHICLE REAR UNDERBODY STRUCTURE
Henry W. Wessells III, Paoli, and Walter S. Eggert, Jr., Huntingdon Valley, Pa., assignors to The Budd Company, Philadelphia, Pa., a corporation of Pennsylvania
Filed May 21, 1968, Ser. No. 730,852
Int. Cl. B60k 5/12
U.S. Cl. 180—64                                       6 Claims

ABSTRACT OF THE DISCLOSURE

A vehicle rear underbody structure for supporting a rear mounted engine. The supporting sidesills are formed by joining a Z-shaped angle member, floor pan and inner wheel housing whereby the inner wheel housing panel acts as a shear panel. The motor mount consists of a cross beam connected to the sidesills and generally L-shaped support brackets secured to the cross beam and sidesills and adapted to support the engine. The sidesills are reinforced at the points of maximum stress where the shock-spring support brackets are connected to the sidesills.

---

This invention relates to a rear engine mounted vehicle body and more particularly to a novel means of body structure for supporting a rear mounted engine.

Ordinarily, a heavy frame, which adds unwanted weight to a vehicle, is needed to support the engine within the vehicle body. An object of this invention is to provide a relatively lightweight structure for supporting the engine and utilizing portions of the body panels in shear loading to support the engine.

In this novel structure, a Z-shaped angle member is welded to each inner uniside panel that forms the rear inner wheel housing and also to the rear floor pan. The rear floor pan is also welded to the inner uniside panel to form a generally box-shaped rear sill member having two sides formed by the angle member, one side by the inner uniside panel and the other side by the rear floor pan. A box-shaped cross beam extends between and is securely welded to the rear sill members but is not attached to the rear floor pan between the sill members. Two pairs of engine support brackets are secured to the cross beam equidistant from the center line of the vehicle for supporting the engine within the body. A bracket from each pair extends to and is welded to the adjacent sidesill. A shock-spring attaching bracket is secured to the sidesills at the same point the engine support bracket is secured to the sidesill so that the point of support by the shocks and springs is also the point of maximum stress on the rear sills. A bulkhead reinforcement bracket is provided to strengthen the sill structure at this point. The weight of the engine creates a moment on the rear part of the sidesills tending to rotate about the shock-spring attaching brackets and is absorbed by the shear loading of the inner uniside panels. With this structure it can be seen there is no direct application of the engine load on the rear floor pan.

The above and other objects of this invention will be readily seen by reference to the following specification and drawing wherein:

FIG. 2 is a view of FIG. 1 substantially along line 2—2, in the direction of the arrows, for illustrating the novel motor support brackets.

FIG. 3 is a top view of FIG. 2 substantially along the line 3—3 in the direction of the arrow for illustrating the manner of connecting the motor support brackets to the cross member and sidesill of the vehicle body.

In this vehicle body, the parts are symmetrical about the center line of the vehicle. Therefore, similar parts on the right and left side of the body will be given the same identification number.

Figure 1:
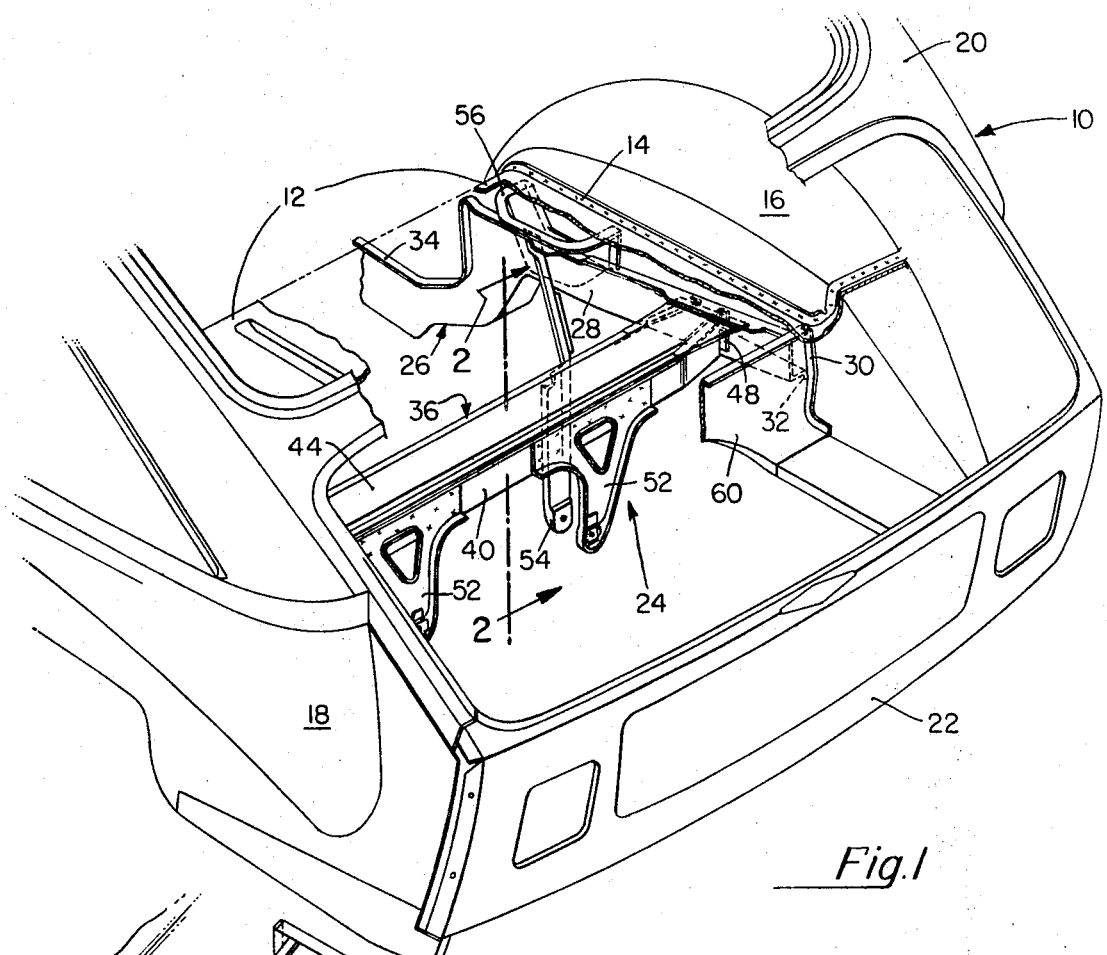
FIG. 1 is a perspective view, with sections broken away, of a rear motor compartment of a vehicle body.

Referring now to the drawings, as best seen in FIG. 1 and FIG. 2, a vehicle body, indicated generally by the numeral 10, includes a rear floor pan 12 having an attaching flange 14 extending vertically along each side for securing the floor pan 14 to the left and right inner uniside panels 16. The inner uniside panels 16 are joined to the outer uniside panels 18 to form the left and right unisides.

The unisides are joined to each side of a roof panel 20 and rear outer panel 22 to complete the rear body shell.

The rear underbody structure 24 includes a pair of generally Z-shaped angle members 26 extending longitudinally of a vehicle body 10 adjacent each of the inner uniside panels 16. The Z-shaped angle member 26 has a horizontal arm 28 and a vertical arm 30. Extending in a vertical plane from the horizontal arm 28 is an attaching flange 32 which is secured to the adjacent inner uniside panel 16 by welding or other suitable means. Extending in a horizontal plane from the vertical arm 30 is an attaching flange 34 which is secured to the adjacent rear floor pan 12 whereby the box-shaped rear sidesills are formed by the angle member 26, inner uniside panel 16 and car floor pan 12.

Figure 4:
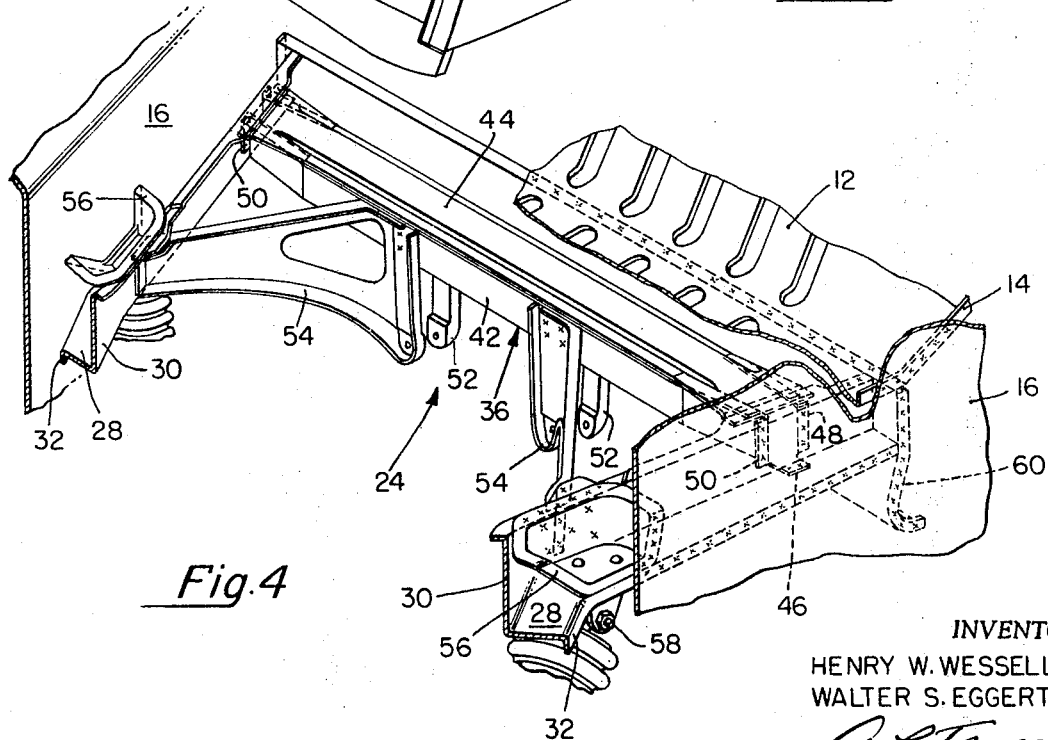
FIG. 4 is a perspective view of the rear underbody structure, looking from the front of the vehicle to the rear, with sections broken away to show the means of attaching the cross member and reinforcing the sidesills.

A box-shaped cross beam 36 extends between and is attached to the Z-shaped angle members 26 of the rear side-sills. As best seen in FIGS. 3 and 4, the cross beam 36 consists of a U-shaped channel member having a web section 38 and a pair of side arms 40, 42 extending therefrom. A cap plate 44 is joined to horizontal flanges extending at right angles from the arms 40, 42, thus completing the box-section. The cross beam is attached to the Z-shaped members of the sidesills by tabs 46, extending from each end of the web section 38 secured to the arm 28 and by attaching flanges 48, 50 extending substantially at right angles from the ends of the respective side arm 40, 42 secured to the arm 30, and by securing the cap plate 44 to the adjacent horizontal attaching flanges 34. The tabs and flanges are attached by welding or other suitable means.

The engine support brackets consist of a pair of legs 52 secured to the rear of the cross beam 36 on arm 40, and a pair of L-shaped legs 54 aligned with the rear legs 52 and having one end secured to the front arm 42 of the cross beam 36 and the other end extending to the adjacent Z-shaped angle member 26 and being secured to the vertical arm 30 thereof. Bulkhead reinforcement brackets 56 are secured to the Z-shaped angle member 26, floor pan 12, and inner uniside 16 at the point of maximum stress where the L-shaped support brackets 54 are joined to the angle members 26 and the shock-spring mounting bracket 58 is attached.

To complete the rear underbody, a lower air shroud 60 extends between the inner unisides 16 adjacent the rear end of the Z-shaped angle members 26 and floor pan 12. The lower air shroud 60 is secured to the inner unisides 16 and rear floor pan 12 to complete the open box engine compartment.

Thus it can be seen that with this novel engine support structure, the engine load is supported by the brackets 52, 54 which transfer the load to the cross beam 36 and the rear ends of the sidesill that is absorbed by the shear shock-spring bracket 58 is diametrically opposed to the engine load, thereby the engine load creates a moment on the rear ends of the sidesill that is absorbed by the shear loading of the inner uniside panel 16.

We claim:
1. In an integral body-frame structure for a rear engine automotive vehicle, a rear engine support including a pair pair of sidesills extending generally longitudinally of said vehicle body, said sidesills including a Z-shaped angle member having attaching flanges extending substantially normal to each arm of the angle in a vertical plane and a horizontal plane, a rear floor pan extending parallel to the horizontally extending flange and secured thereto, said rear floor pan having an attaching flange generally normal to said rear floor pan and substantially in the plane of said vertical angle member attaching flange, and an inner wheel housing secured to said vertical angle flange and said rear floor pan flange for completing said sidesill having a generally rectangular cross-section; a box section cross member extending between said sidesills and having each end thereof secured to the adjacent sidesill, a plurality of engine support brackets extending from said cross member for supporting an engine within the vehicle body, and at least one of said engine support brackets extending to and being secured to one of said sidesills.

2. The vehicle body structure as claimed in claim 1 wherein said engine support brackets include a pair of L-shaped engine support brackets having one end secured to said cross member and the other end secured to the adjacent sidesill.

3. The vehicle body structure as claimed in claim 2 wherein said sidesill includes a bulkhead reinforcement bracket secured therein in the area at which said L-shaped engine support bracket is secured to said sidesill.

4. In an integral body-frame structure for a rear engine automotive vehicle, a rear engine support including a pair of sidesills extending generally longitudinally of said vehicle body, a box section cross member extending between said sidesills and having each end thereof secured to the adjacent sidesill, a plurality of engine support brackets extending from said cross member for supporting an engine within the vehicle body, said engine support brackets including a pair of L-shaped engine support brackets, each of said L-shaped engine support brackets having one end of one of the arms of the L secured to one of said sidesills and the other end of the junction of the arms of the L secured to said cross member, a bulkhead reinforcement bracket secured within each sidesill in the area at which said L-shaped engine support bracket is secured thereto, and a pair of shock-spring attaching brackets, one of said shock-spring attaching brackets secured to each of said sidesills in the area at which said bulkhead reinforcement bracket is positioned whereby support is provided for said body-frame structure by the supporting rear springs and shock absorbers.

5. The vehicle body structure as claimed in claim 1 wherein the weight of an engine supported by said engine support brackets creates a moment about said shock-spring support bracket and said inner wheel housing supports said engine and resists such moment as a shear panel.

6. In an integral body-frame structure for a rear engine automotive vehicle; a rear body structure having a roof panel, a pair of uniside structures, one uniside structures, one uniside structure attached along each side of said roof panel, a rear outer panel extending between and joined to said uniside structures, each uniside structure including an outer uniside panel and an inner uniside panel joined to said outer uniside panel, a rear floor pan extending between and joined to said inner uniside panels, a lower air shroud extending between and joined to said inner uniside panels and to the bottom of said rear floor pan; a rear underbody structure including a pair of Z-shaped angle members extending longitudinally of said body structure, a sidesill formed along each side of said body structure including one of said angle members adjacent said inner panel of each of said uniside structures, each of said angle members having one longitudinal edge joined to the adjacent inner uniside panel and the other longitudinal edge being adjacent and joined to said rear floor pan for forming one of said sidesill, a shock-spring attaching bracket secured to each of said angle members, a bulkhead reinforcement bracket positioned in and joined to each of said sidesills adjacent said shock-spring bracket, a box-shaped cross beam extending between and joined to said sidesills adjacent to said rear floor pan to the rear of said bulkhead reinforcing bracket, a plurality of engine support brackets joined to said cross beam for supporting an engine within said body structure, one of said engine support brackets having a portion thereof extending to and being joined to each of said sidesills in the area of said bulkhead reinforcing bracket whereby the weight of a supported engine will create a moment about the shock-spring support bracket that will be resisted by the inner uniside panel acting as a shear panel.

References Cited
UNITED STATES PATENTS

| 2,852,085 | 9/1958 | Strong. | |
| 2,076,046 | 4/1937 | Schjolin | 180—64 XR |

FOREIGN PATENTS

| 829,206 | 3/1938 | France. |
| 503,514 | 1939 | Great Britain. |
| 878,291 | 9/1961 | Great Britain. |

LEO FRIAGLIA, Primary Examiner

M. L. SMITH, Assistant Examiner

U.S. Cl. X.R.

296—28